(12) United States Patent
Li et al.

(10) Patent No.: US 8,180,955 B2
(45) Date of Patent: May 15, 2012

(54) COMPUTING SYSTEMS AND METHODS FOR MANAGING FLASH MEMORY DEVICE

(75) Inventors: Rong Li, San Diego, CA (US); Huaqiao Wang, San Diego, CA (US); Yuefeng Jin, San Diego, CA (US)

(73) Assignee: Via Telecom, Inc., San Diego, CA (US)

( * ) Notice: Subject to any disclaimer, the term of this patent is extended or adjusted under 35 U.S.C. 154(b) by 251 days.

(21) Appl. No.: 12/705,641

(22) Filed: Feb. 15, 2010

(65) Prior Publication Data

US 2010/0287327 A1 Nov. 11, 2010

(30) Foreign Application Priority Data

May 6, 2009 (CN) .......................... 2009 1 0136521
May 6, 2009 (TW) ............................... 98114956 A

(51) Int. Cl.
*G06F 12/00* (2006.01)
(52) U.S. Cl. ..... 711/103; 711/3; 711/202; 711/E12.001; 711/E12.008; 711/E12.078; 711/E12.017; 711/E12.059
(58) Field of Classification Search .................. 711/103, 711/3, 202, E12.001, E12.008, E12.017, 711/E12.059, E12.078
See application file for complete search history.

(56) References Cited

U.S. PATENT DOCUMENTS

| | | | | |
|---|---|---|---|---|
| 2004/0210706 A1* | 10/2004 | In et al. | .......................... | 711/103 |
| 2009/0031076 A1* | 1/2009 | In et al. | .......................... | 711/103 |
| 2009/0235010 A1* | 9/2009 | Suzuki | .............................. | 711/3 |

* cited by examiner

*Primary Examiner* — Yong Choe
(74) *Attorney, Agent, or Firm* — Thomas|Kayden

(57) ABSTRACT

A computing system is provided. A flash memory device includes at least one mapping block, at least one modification block and at least one cache block. A processor is configured to perform: receiving a write command with a write logical address and predetermined data, loading content of a cache page from the cache block corresponding to the modification block according to the write logical address to a random access memory device in response to that a page of the mapping block corresponding to the write logical address has been used, the processor, reading orderly the content of the cache page stored in the random access memory device to obtain location information of an empty page of the modification block, and writing the predetermined data to the empty page according to the location information. Each cache page includes data fields to store location information corresponding to the data has been written in the pages of the modification block in order.

19 Claims, 19 Drawing Sheets

300

| Logical block number (LBN) | Physical block number |
|---|---|
| 0 | 0x0002 |
| 1 | 0xFFFF |
| 2 | 0xFFFF |
| 3 | 0xFFFF |
| 4 | 0x0005 |
| 5 | 0xFFFF |

| Cache block number | Physical block number | Number of a first free page |
|---|---|---|
| 0 | 0x0006 | 0x0008 |
| 1 | 0x0007 | 0x0003 |
| 2 | N/A | N/A |
| 3 | N/A | N/A |

| Cache block number | Physical block number | Number of a first free page |
|---|---|---|
| 0 | 0x0006 | 0x0008 |
| 1 | 0x0007 | 0x0008 |
| 2 | 0x0008 | 0x0008 |
| 3 | 0x0009 | 0x0002 |

FIG. 5b

COMPUTING SYSTEMS AND METHODS FOR MANAGING FLASH MEMORY DEVICE

CROSS REFERENCE TO RELATED APPLICATIONS

This Application claims priority of Taiwan Patent Application No. 98114956 and China Patent Application No. 200910136521.9, both filed on the same date, May 6, 2009, the entirety of which is incorporated by reference herein.

BACKGROUND OF THE INVENTION

1. Field of the Invention

The invention relates to a method for managing a memory device, and more particularly to a method for optimizing read and write operations of a flash memory device.

2. Description of the Related Art

A flash memory or EEPROM (Electrically Erasable Programmable Read Only Memory) is a special type of nonvolatile memory capable of electrically erasing and programming data. In this context, these two terms, flash memory and EEPROM, are usually equivalent and interchangeable. Flash memory based storage devices have low power consumption and small size as compared to magnetic disc memory based devices. Thus, they are often used as storage devices for mobile computing devices such as digital cameras, mobile phones, or personal digital assistants (PDAs).

In magnetic disc drives, new data can be directly written over previous data bitwise or byte wise. However, in flash memories, a block needs to be erased before it is rewritten with new data. That is, the read and write operations of flash memories are based on pages or sectors, while the erase operation is based on blocks. Thus, an erase operation typically requires much more time than a write and a read operation. Furthermore, since a block's size is much larger than a page and a sector, the entire block needs to be erased even only a tiny portion of the block gets update.

Conventionally, a media management layer is used to improve the read and write operation performance by implementing mapping schemes. When data stored in a specific block requires modification, a free block (named a log block) may be used to store the modification records. In this manner, every time the data stored in a specific block requires modification, the new data is written into a corresponding log block to avoid erasing a whole block for the write operation. However, in the read operation, a process of visiting (i.e. reading or traversing) the data in a reverse order from the end of the log block is required to retrieve the latest data, which seriously degrades the reading speed due to a huge amount of unnecessary read operation during the reversely visiting.

Therefore, a novel memory device managing method for optimizing read and write operations of a flash memory device and greatly accelerating the read and write operations is highly required.

BRIEF SUMMARY OF THE INVENTION

Computing systems and methods for managing a flash memory device are provided. The flash memory device comprises at least one mapping block, at least one modification block and at least one cache block. An exemplary embodiment of a method for managing the flash memory device comprises: receiving a write command comprising a write logical address and predetermined data for writing the predetermined data in the flash memory device; determining whether a page of the mapping block corresponding to the write logical address has been used, and if so, writing the predetermined data in an empty page of the modification block corresponding to the mapping block in response to that the page of the mapping block corresponding to the write logical address has been used. The writing step further comprises: loading content of a cache page of the cache block corresponding to the modification block according to the write logical address to a random access memory device, and reading orderly a plurality of data fields of the cache page in the random access memory device to obtain location information of the empty page of the modification block, wherein cache page of the cache block comprises the plurality of data fields to store the location information corresponding to the data which has been written in the pages of the modification block in order; and writing the predetermined data in the empty page of the modification block according to the obtained location information.

Another exemplary embodiment of a method for managing the flash memory device comprises receiving a read command comprising a read logical address for reading data from a page of the flash memory device; and determining whether data stored in a page of the mapping block corresponding to the read logical address has been modified, and if so, reading the predetermined data from the modification block corresponding to the mapping block in response to that the data stored in the page of the mapping block corresponding to the read logical address has been modified. The reading step further comprises: loading content of a cache page of the cache block corresponding to the modification block according to the read logical address to a random access memory device, and reading orderly a plurality of data fields of the cache page stored in the random access memory device to obtain location information of the page corresponding to the read logical address in the modification block, wherein cache page of the cache block comprises the plurality of data fields to store the location information corresponding to data which has been written in the pages of the modification block in order; and reading the predetermined data from the page of the modification block according to the location information.

An exemplary embodiment of a computing system comprises a flash memory device, a random access memory device and a processor. The flash memory device comprises at least one mapping block, at least one modification block and at least one cache block. The processor is coupled to the flash memory device and the random access memory device, and is configured to perform: receiving a write command comprising a write logical address and predetermined data, loading content of a cache page from the cache block corresponding to the modification block according to the write logical address to the random access memory device in response to that a page of the mapping block corresponding to the write logical address has been used, reading orderly the content of the cache page stored in the random access memory device to obtain location information of an empty page of the modification block, and writing the predetermined data to the empty page according to the location information. Each cache page of the cache block comprises a plurality of data fields to store location information corresponding to the data has been written in the pages of the modification block in order.

Another exemplary embodiment of a computing system comprises a flash memory device, a random access memory device and a processor. The flash memory device comprises at least one mapping block, at least one modification block and at least one cache block. The processor is coupled to the flash memory device and the random access memory device, and is configured to perform: receiving a read command including a read logical address, loading content of a cache page from the cache block corresponding to the modification block according to the read logical address to the random access memory device in response to tat a page of the mapping block corresponding to the read logical address has been modified, reading orderly the content of the cache page stored in the random access memory device to obtain location information of a page corresponding to the read logical address in the modification block, and reading predetermined data from the page of the modification block corresponding to the read logical address according to the location information. Each cache page of the cache block comprises a plurality of data fields to orderly store the location information corresponding to data which has been written in the page of the modification block.

Another exemplary embodiment of a method for managing the flash memory device comprises receiving an access command comprising a logical address to access predetermined data in the flash memory device; and accessing the modification block corresponding to the mapping block in response to that the mapping block corresponding to the logical address is determined not to be accessed for the predetermined data. The step of accessing the modification block further comprises: loading content of a cache page corresponding to the modification block from the cache block in the flash memory device to a random access memory device and reading orderly the content of the cache page in the random access memory device to obtain location information for accessing the predetermined data in the modification block, wherein cache page of the cache block comprises a plurality of data fields to store the location information corresponding to the data which has been written in the pages of the modification block in order; and accessing the predetermined data in the modification block of the flash memory device according to the location information.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3 shows an exemplary data structure of a logical block number to physical block number mapping table according to an embodiment of the invention;

FIG. 5a and FIG. 5b show the exemplary data structure of a cache block index table according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
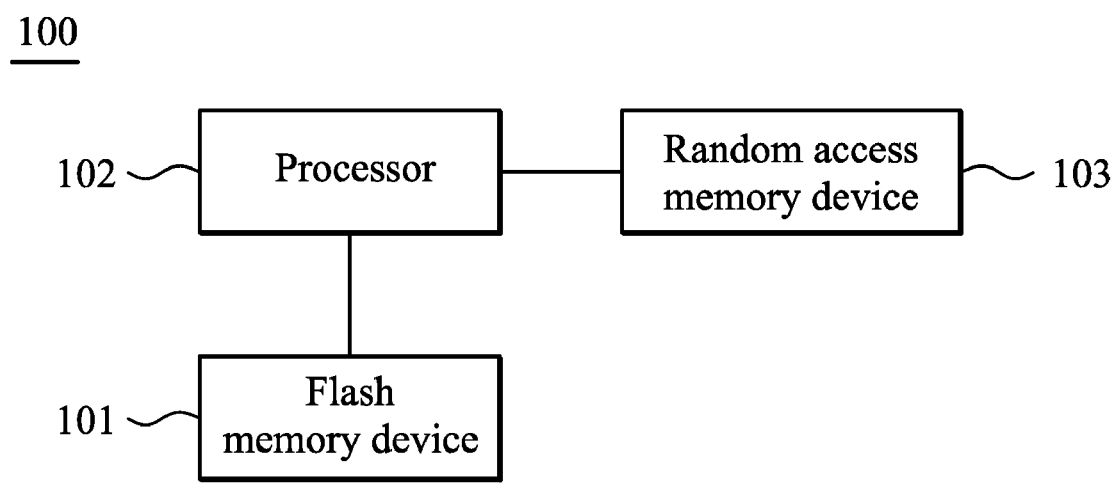
FIG. 1 shows a computing system according to an embodiment of the invention.

FIG. 1 shows a computing system 100 according to an embodiment of the invention. The computing system 100 comprises a flash memory device 101, a processor 102 and a random access memory device 103. The processor 102 manages the flash memory device 101 according to the received commands by executing program codes. According to an embodiment of the invention, the flash memory device 101 may be a memory device having the property that in the access operation, size of a minimum erasable memory unit should be larger than size of a minimum writable memory unit. As an example, a NAND flash or a NOR flash. The flash memory device 101 may comprise at least one mapping block, at least one modification block and at least one cache block. For a NAND flash, each of the mapping block, the modification block and the cache block may comprise a plurality of pages. For a NOR flash, each of the mapping block, the modification block and the cache block may comprise a plurality of sectors. In the specification, the term 'page' is used for brevity. It should be noted that the invention is not limited thereto. Those who are skilled in this technology can still make various alterations and modifications without departing from the scope and spirit of this invention and implement the concept of this invention to any type of flash memory.

Figure 2:
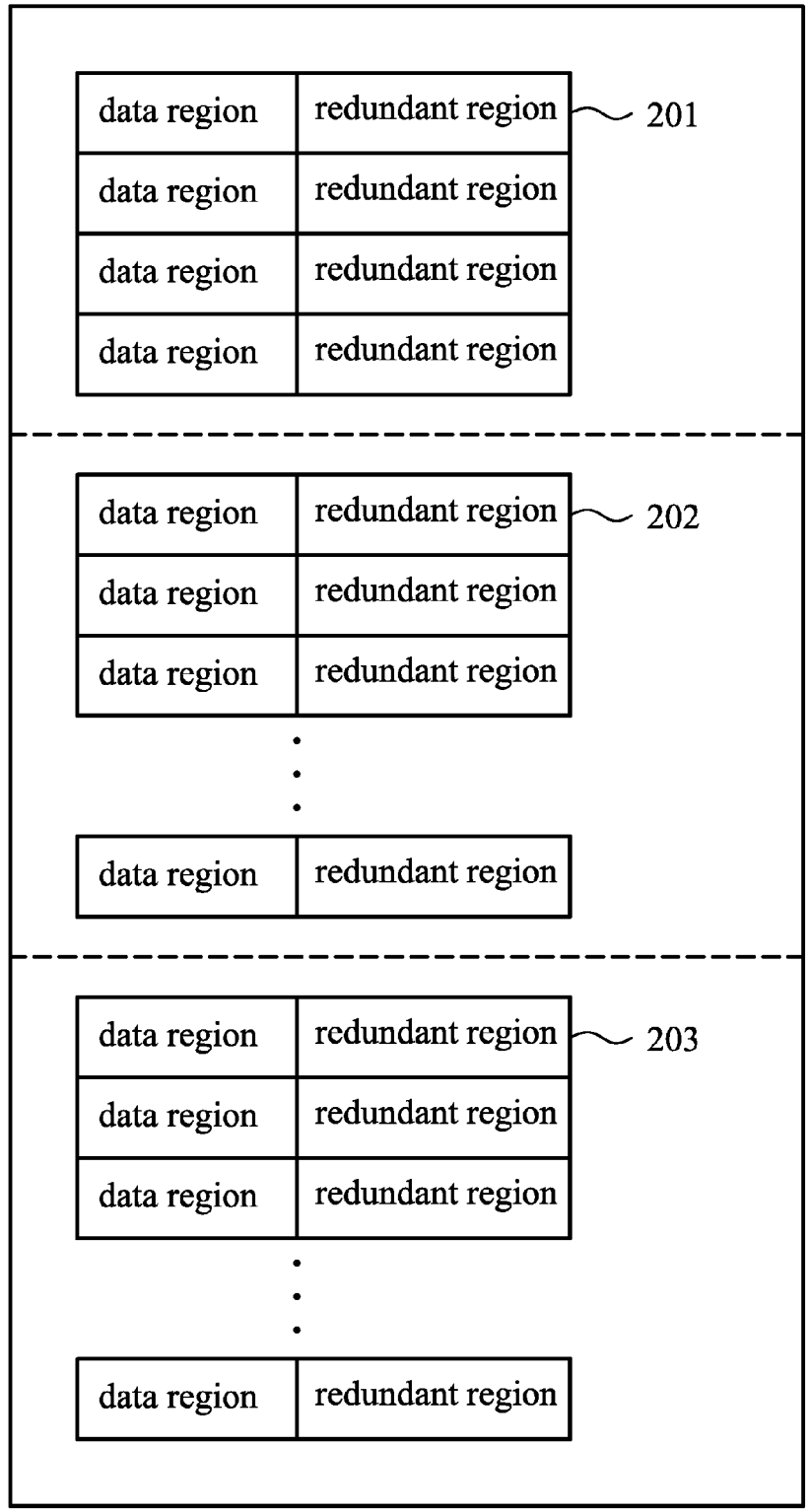
FIG. 2 shows schematic data structures of the flash memory device.

According to an embodiment of the invention, the mapping block is utilized to store original data. Each mapping block may correspond to at least one corresponding modification block to store the modified data when the original data has to be modified. In addition, each modification block may correspond to at least one corresponding page (hereinafter called a cache page) in a cache block for storing location information of the data stored in the modification block. FIG. 2 shows schematic data structures of the flash memory device. As shown in FIG. 2, the flash memory device 200 may comprise a plurality of cache blocks 201, a plurality of mapping blocks 202 and a plurality of modification blocks 203. Each page of the cache blocks 201 may comprise a data region and a redundant region. The data region may comprise a plurality of data fields to store the location information of the data written in the page of a corresponding modification block. Take a 256 MB flash memory as an example, suppose 2048 memory blocks would be allocated. The block size is equal to 128 KB. Assume each block comprises 256 pages (or sectors). The size of data region in each page may be 512 bytes. In addition to the data region, a 16 byte redundant region may further be allocated in each page. According to an embodiment of the invention, 2 bytes are taken for recording each location information, there may be 256 (512/2) data fields obtained in the data region in each page of the cache block 201. One data field in the cache block 201 stores the location information for one page of the corresponding modification block. Therefore, for a modification block with 256 pages (or sectors), the whole location information of the data written in different pages of the corresponding modification block may be recorded within one cache page of the corresponding cache block. Note that the redundant region of the corresponding cache block 201 may store a cache block index of the cache block 201 and a physical block number of the modification block corresponding to the cache block 201 (which will be illustrated in more detail in the following paragraphs). In addition, as shown in FIG. 2, the mapping block 202 and modification block 203 may also comprise a data region and a redundant region. The redundant regions of the mapping block 202 and modification block 203 may store the logical block number and logical page number of the data written in the data region of corresponding page of the mapping block 202 and modification block 203, respectively (which will be illustrated in more detail in the following paragraphs).

According to an embodiment of the invention, when writing the flash memory device 101, the processor 102 receives a write command comprising a write logical address and predetermined data, and obtains a logical block number LBN and a logical page number LSN corresponding to the write logical address. Suppose that each block of the flash memory device 101 comprises 8 pages, and the size of each page is 10 bytes. As an example, when the write logical address is 90, the logical block number LBN may be obtained by taking the quotient of dividing 90 by 80 (i.e. 90/80), and the logical page number LSN may be obtained by taking the remainder of dividing 90 by 80 (i.e. 90/80) and further divide the remainder (i.e. 10) by the page size (i.e. 10). In this example, the LBN=1 and LSN=1 given the first logical block number and the first page number are both zero (0). Therefore, the processor 102 is instructed to store the predetermined data in the page 1 of the logical block 1. The processor 102 may further obtain a corresponding mapping block according to the logical block number LBN. The mapping block is a physical block that is actually allocated in the flash memory device 101 for storing the original data corresponding to the logical block. Given that the processor 102 determines that a page of the mapping block corresponding to the obtained logical page number LSN has not been written with data, the processor 102 may write the predetermined data in the page. On the other hand, if the page has already been written with data, the processor 102 may obtain a modification block corresponding to the mapping block and a cache block corresponding to the modification block, write the predetermined data in an empty page of the corresponding modification block, and store the obtained logical page number LSN of the predetermined data in an empty page of the corresponding cache block.

Figure 4:
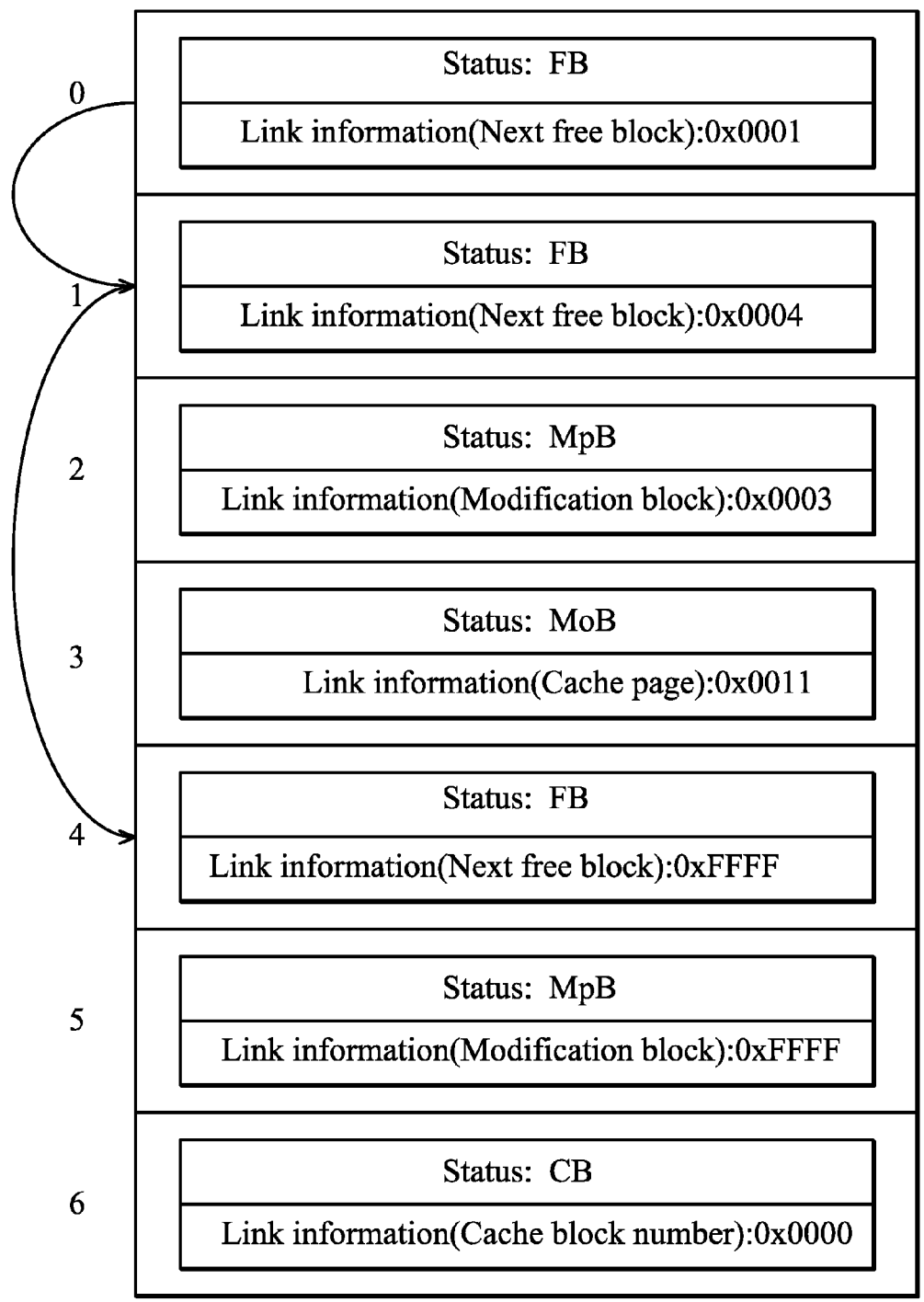
FIG. 4 shows an exemplary data structure of a physical block information table 400 according to an embodiment of the invention.

According to an embodiment of the invention, the processor 102 may further establish a logical block number to physical block number mapping table (a first table), a physical block information table (a second table) and a cache block index table (a third table) in the random access memory 103. FIG. 3 shows an exemplary data structure of a logical block number to physical block number mapping table 300 according to an embodiment of the invention. According to the embodiment of the invention, the logical block number to physical block number mapping table 300 stores a physical block number of a mapping block corresponding to each logical block in an order of the logical block number (LBN). As an example, for a logical block with logical block number LBN=0, the physical block number of the corresponding mapping block is 0x0002. FIG. 4 shows an exemplary data structure of a physical block information table 400 according to an embodiment of the invention. According to an embodiment of the invention, the physical block information table 400 stores status and link information of each physical block in an order of the physical block number. As an example, the physical block with physical block number 0 is a free block (FB) or a block that has never been used or all data on this block is no longer valid. For a free block, the link information stores the physical block number of a next free block. The physical block with physical block number 2 is a mapping block (MpB), where the link information of the mapping block stores the physical block number (0x0003) of a corresponding modification block. The physical block with physical block number 3 is a modification block (MoB), where the link information of the modification block stores a cache block index of a corresponding cache page. The cache block index may comprise the location information of the cache block and the cache page corresponding to the modification block. As an example, for the cache block comprising 8 pages, the cache block index 0x0011 points to the allocated page 3 (the remainder of dividing 11 by 8) of the cache block 1 (the quotient of dividing 11 by 8) in the computing system. The physical block with physical block number 6 is a cache block (CB), where the link information of the cache block stores a cache block number of the cache block. FIG. 5a shows an exemplary data structure of a cache block index table 500 according to an embodiment of the invention. The cache block index table 500 stores a physical block number and a page number of a first free cache page (that is, the first empty cache page) of the cache block in an order of the cache block number. As shown in the figure, suppose that at maximum 4 cache blocks are allocated in the computing system, wherein each cache block comprises 8 pages. So the cache block index table 500 stores a physical block number and a page number of a first free cache page of the four cache blocks in order of the cache block number. According to an embodiment of the invention, a new cache block may not be allocated during the access operation until all of the pages of a cache block have been used. As shown in FIG. 5a, the cache block 1 is used since the cache block 0 is already full.

Figure 6:
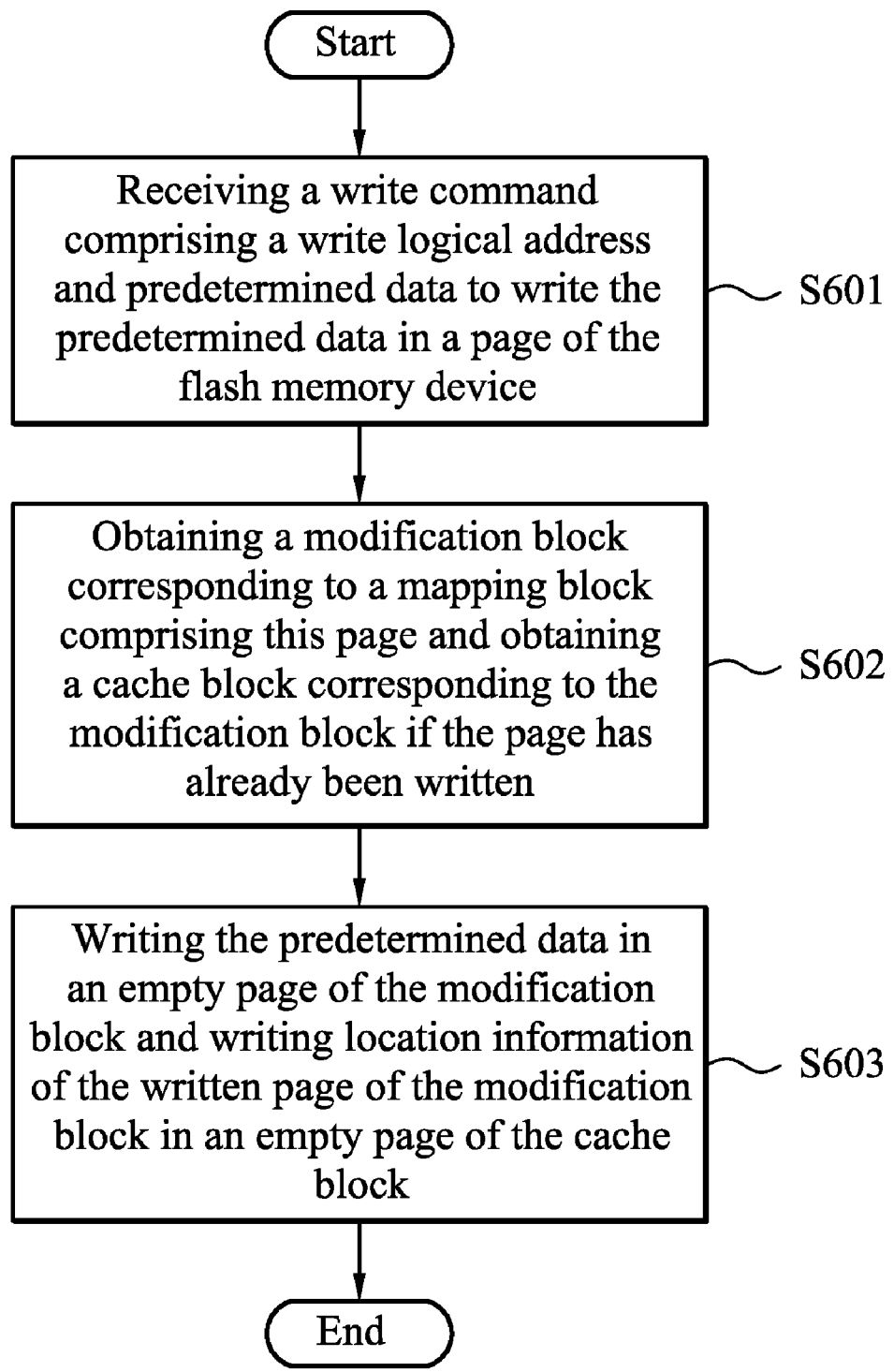
FIG. 6 shows a flow chart of a method for managing a flash memory device according to an embodiment of the invention.

FIG. 6 shows a flow chart of a method for managing a flash memory device according to an embodiment of the invention. As shown in the figure, the processor 102 receives a write command comprising a write logical address and predetermined data so as to write the predetermined data in a page of the flash memory device according to the write command (Step S601). Next, if the page has already been written with data, the processor 102 obtains a modification block corresponding to a mapping block comprising the page and obtains a cache block corresponding to the modification block (Step S602). Finally, the processor 102 writes the predetermined data in an empty page of the corresponding modification block and writes location information of the written page of the modification block in an empty page of the corresponding cache block (step S603).

Figure 7A:
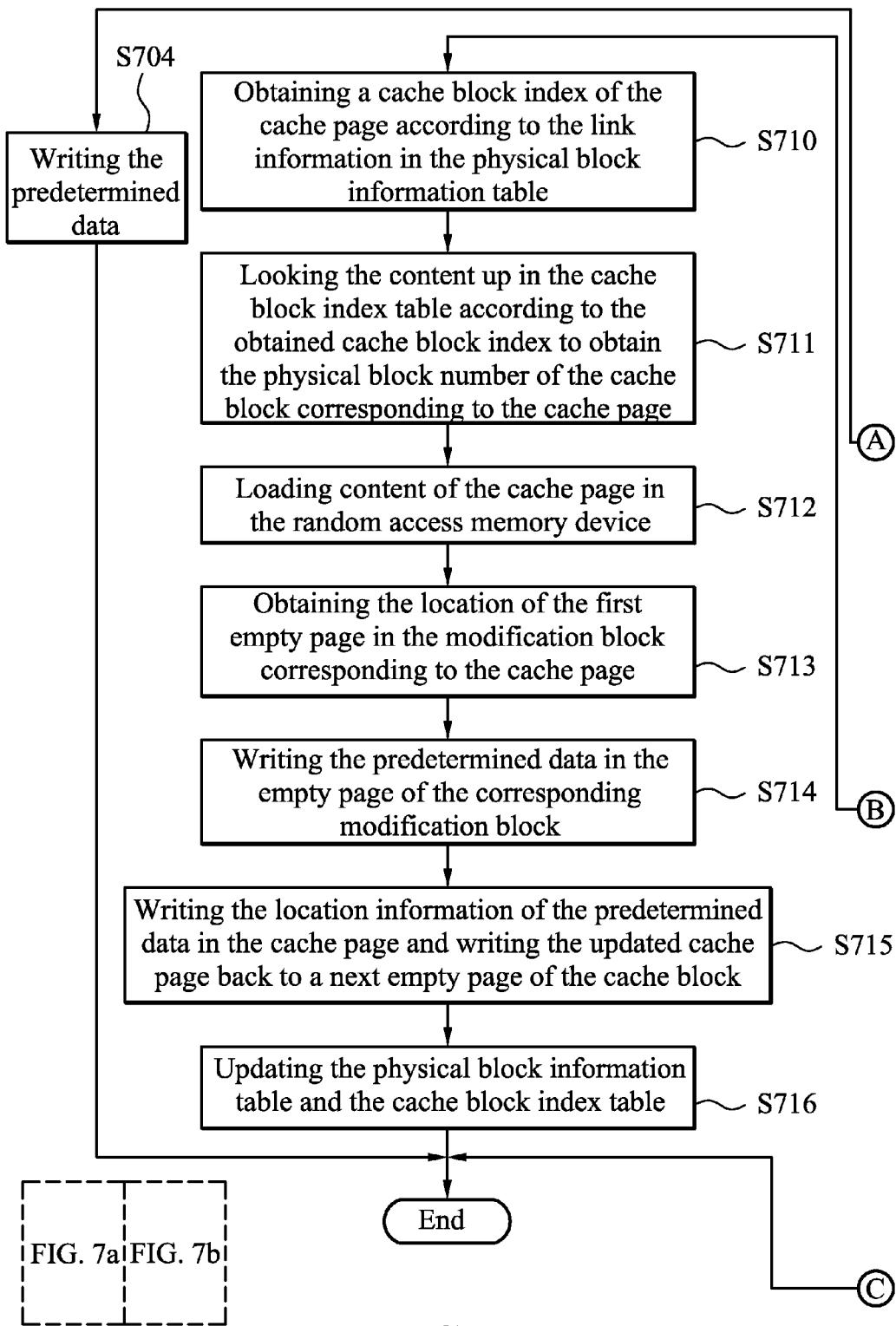
FIG. 7a-7b show a detailed flow chart for writing the flash memory device according to an embodiment of the invention.
Figure 7B:
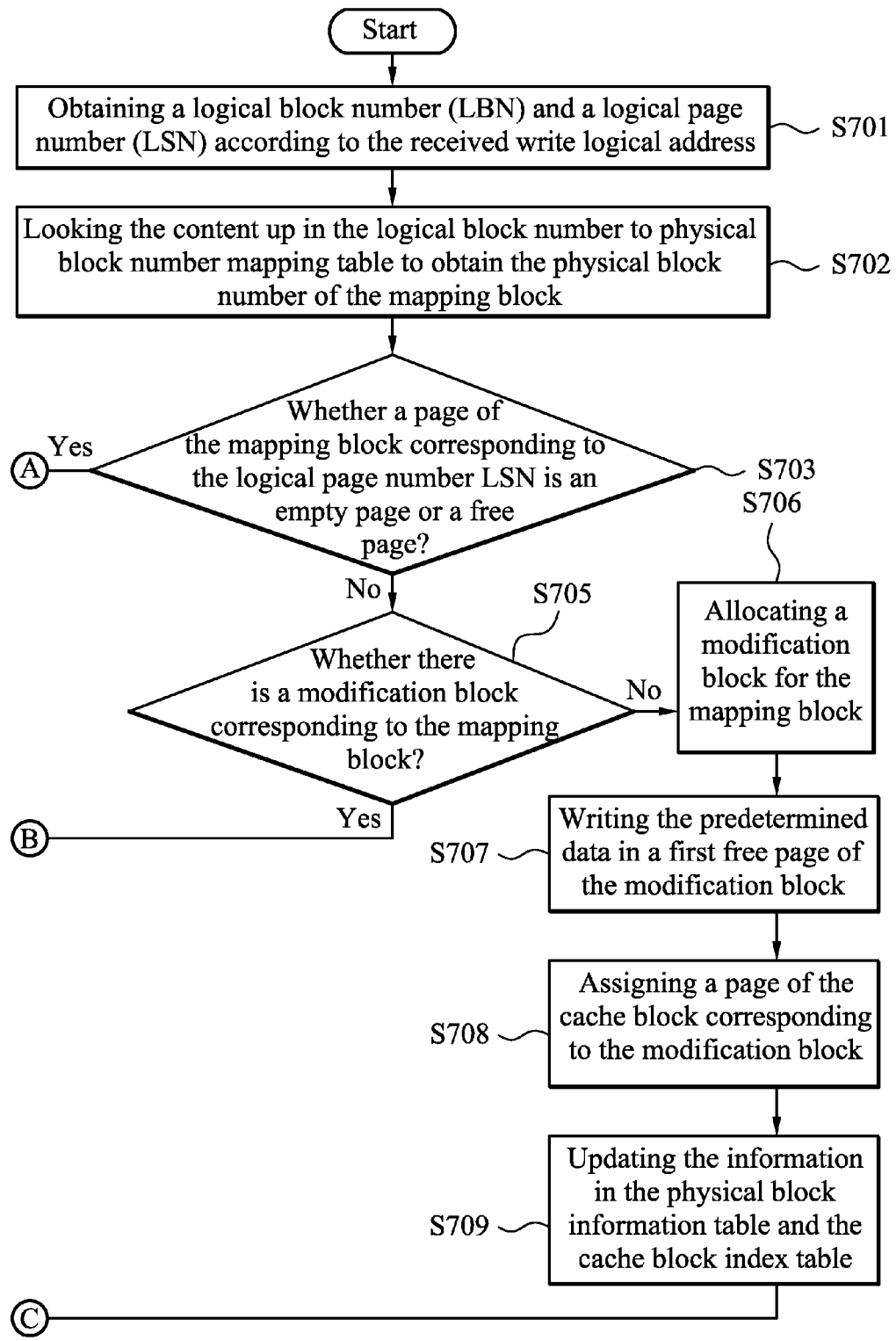

FIG. 7a-7b show a detailed flow chart for writing the flash memory device according to an embodiment of the invention. Firstly, the processor 102 obtains a logical block number (LBN) and a logical page number (LSN) according to the write logical address received in the write command (step S701). Next, the processor 102 looks the content up in the logical block number to physical block number mapping table (the first table) to obtain the physical block number of the mapping block (Step S702). Next, the processor 102 determines whether a page of the mapping block corresponding to the logical page number LSN is an empty page or a free page (Step S703). If the page is an empty page, the processor 102 writes the predetermined data in the page (Step S704). Otherwise, if the page has already been written with data, the processor 102 further determines whether there is a modification block corresponding to the mapping block by looking the content up in the physical block information table (the second table) (Step S705). If there is no modification block corresponding to the mapping block, the processor 102 allocates a modification block for the mapping block (Step S706). Next, the processor 102 writes the predetermined data in a first free page (page 0) of the corresponding modification block (Step S707), assigns a page of the cache block corresponding to the modification block (Step S708) for recording location information of the predetermined data (as an example, the logical page number LSN), and finally updates the mapping block, the corresponding modification block and the corresponding cache block information in the physical block information table (reference may be made in FIG. 4) and the cache block index table (reference may be made in FIGS. 5a and 5b) (Step S709).

On the other hand, if there is a modification block corresponding to the mapping block, the processor 102 obtains a cache block index of the cache page corresponding to the modification block according to the link information of the mapping block in the physical block information table (Step S710). Consequently, the processor 102 looks up the content in the cache block index table according to the obtained cache block index to obtain the physical block number of the cache block corresponding to the cache page (Step S711). Next, the processor 102 loads content of the cache page in the random access memory device 103 (Step S712). In consequence, the processor 102 reversely visits (that is, reads) the data from the end of the cache page loaded in the random access memory device 103 to obtain the index of a first empty data filed that has not been used in the data region of the cache page. According to the index of a first empty data filed of the cache page, the processor 102 obtains the location of the first empty page in the modification block corresponding to the cache page (Step S713), and writes the predetermined data in the empty page of the corresponding modification block (Step S714). Next, the processor 102 writes the location information (as an example, the logical page number LSN) of the predetermined data in the first free data field of the cache page loaded in the random access memory device 103, and writes the updated cache page back to a next empty page of the cache block in the flash memory device 101 (Step S715). Finally, the processor 102 updates information of the mapping block, the corresponding modification block and the corresponding cache block in the physical block information table (reference may be made to FIG. 4) and the cache block index table (reference may be made in FIGS. 5a and 5b) (Step S716).

Figure 8A:
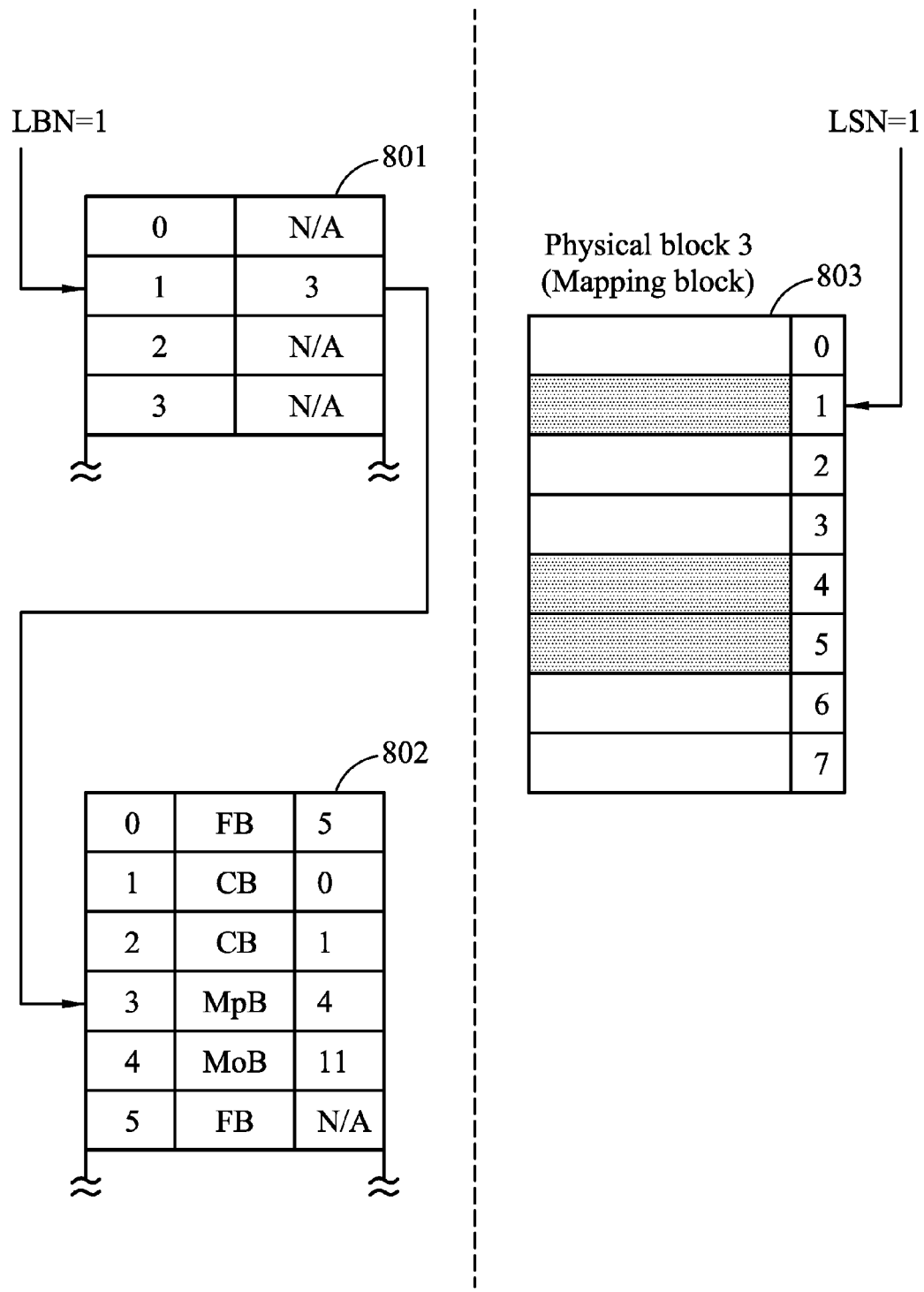
FIG. 8a-8e show the schematic diagrams for writing the flash memory device according to an embodiment of the invention.

FIG. 8a-8e show the schematic diagrams for writing the flash memory device according to an embodiment of the invention. It is noted that the dotted line shown in the figures is used to separate the data stored in the flash memory device 101 and the random access memory device 103, wherein the data in the flash memory device 101 is shown at the right side of the dotted line. As previously described, suppose that there are 8 pages in a memory block of the flash memory device 101 and the size of one page is 10 bytes, given that the received write logical address is 90, the logical block number LBN is the quotient of dividing 90 by 80, and the logical page number LSN is obtained by taking the remainder of dividing 90 by 80 and further divide the remainder by the page size. That is, in the example, LBN=1 and LSN=1. Therefore, the processor 102 is required to write the predetermined data in the page 1 of the logical block 1. Next, as shown in FIG. 8a, the processor 102 looks up the content of the data field in index 1 of the logical block number to physical block number mapping table 801 to obtain the physical block number of the mapping block. According to an embodiment of the invention, assuming that the data field is empty, it means that the logical block 1 is not yet been assigned with a corresponding mapping block. Therefore, the processor 102 may assign a mapping block to the logical block. On the other hand, if the data field is not empty, it means that there is a corresponding mapping block assigned to the logical block. As an example, in the embodiment, the value 3 in the logical block number to physical block number mapping table 801 indicates that the physical block number of the mapping block is 3. Thus, the mapping block is actually the physical block numbered 3. Next, the processor 102 access page 1 of the mapping block 803 (physical block 3) according to the logical page number (LSN=1) and determines whether the page has already been used. According to an embodiment of the invention, the processor 102 may determine whether the page has already been used according to the logical block number LBN and the logical page number LSN recorded in the redundant region of the page. Given there is no LBN and LSN recorded, the processor 102 may directly write data in the page. On the other hand, if the LBN and LSN have already been recorded in the redundant region, it means that the data region of the page has already been used. As shown in the page 1 of the mapping block 803, the column filled with dots represents that the page has already been used. Therefore, the processor 102 further looks up content in the data field in index 3 of the physical block information table 802 according to the obtained physical block number 3. The physical block information table 802 comprises the status and link information fields as previously illustrated. The status field indicates whether the physical block is a free block (FB), a cache block (CB), a mapping block (MpB) or a modification block (MoB), and the link information field indicates the link information of the physical block. If the link information of the mapping block is empty, it means that the original data stored in the mapping block has not been modified. The processor 102 may next obtain a corresponding modification block and a corresponding cache block, store the predetermined data in an empty page of the modification block and store the logical page number (LSN=1) corresponding to the predetermined data in an empty page of the corresponding cache block. On the other hand, if the link information of the mapping block is not empty, as shown in FIG. 8a, the processor 102 may obtain the number 4 as the physical block number of the modification block corresponding to the mapping block.

Figure 8B:
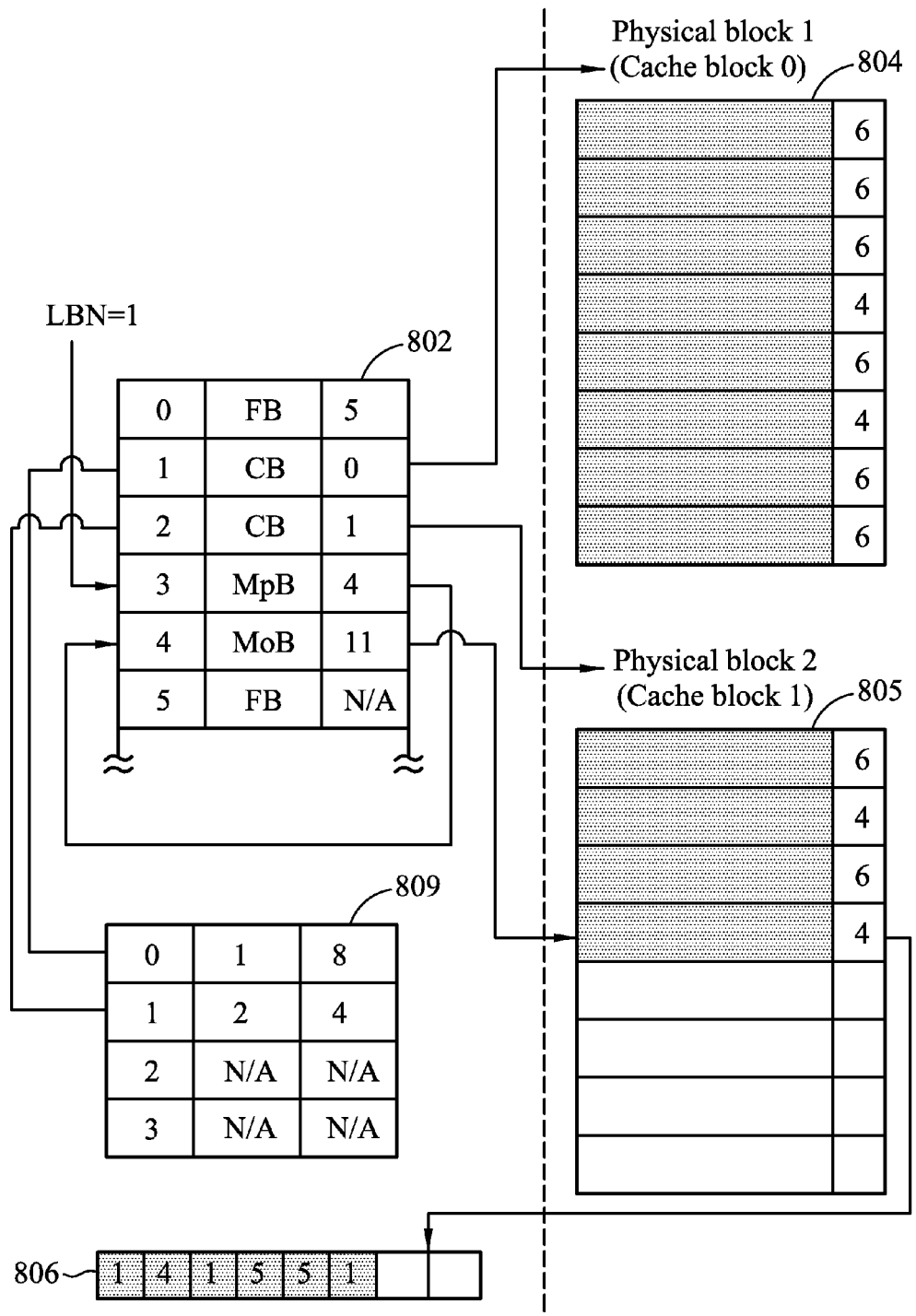

Next, the processor looks up the physical block information table 802 according to the physical block number of the corresponding modification block to obtain the link information of the modification block. As previously described, the link information of a modification block is the cache block index of the corresponding cache page. The processor 102 obtains the location information of the corresponding cache block according to the cache block index. In the embodiment, the cache block index is 11, it means that the cache page is located in page 3 (the remainder of dividing 11 by 8) of the cache block 1 (the quotient of dividing 11 by 8). Refer to FIG. 8b, the processor 102 obtains the physical block number of the corresponding cache block comprising the cache page by looking the content up in the cache block index table 809. As shown in the cache block index table 809, the physical block number of the cache block 1 (cache block number is 1) is 2. Next, the processor 102 accesses page 3 in the cache block 805.

Note that as previously described, the redundant region of the cache block may also record the physical block number of the corresponding modification block. As an example, the redundant region (the columns at the right side) of the cache block 804 and 805 may record the physical block number of the corresponding modification block so as to indicate which modification block is the location information stored in the corresponding data region in each page belongs to. According to an embodiment of the invention, in response to that the cache page 806 is obtained according to the cache block index, the processor 102 loads the content of the cache page 806 to the random access memory device 103.

Figure 8C:
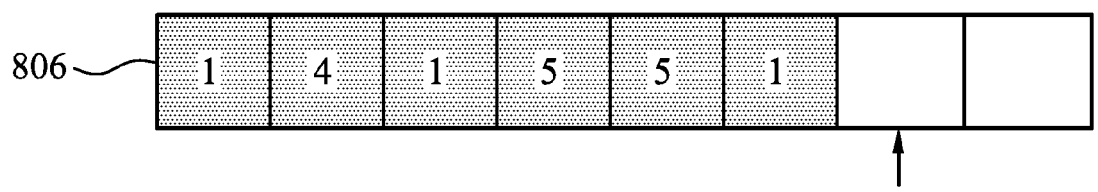

In the embodiment, the processor 102 reversely reads content of the cache page 806 from the end of the loaded cache page for writing of the flash memory device. As shown in FIG. 8c, the processor 102 obtains the latest data (the logical page number LSN) stored in column 5 of the cache page 806 (note that the column number may start from 0). Therefore, the processor 102 obtains the page number 6 of the next usable empty page in the corresponding modification block.

It is noted that in the embodiment, since the content of the cache page 806 has already been loaded in the random access memory 103, the processor 102 may soon obtain the location of the next free page in the corresponding modification block by rapidly reading the cache page in the random access memory. Therefore, as compared to the reversely read of each page in the flash memory to obtain the location of the next free page of the modification block for conventional designs, the writing speed of the flash memory device is greatly improved because according to the proposed flash memory managing method, only one page of the cache block (that is, the cache page) is needed to be accessed for obtain the location of the next free page.

Figure 8D:
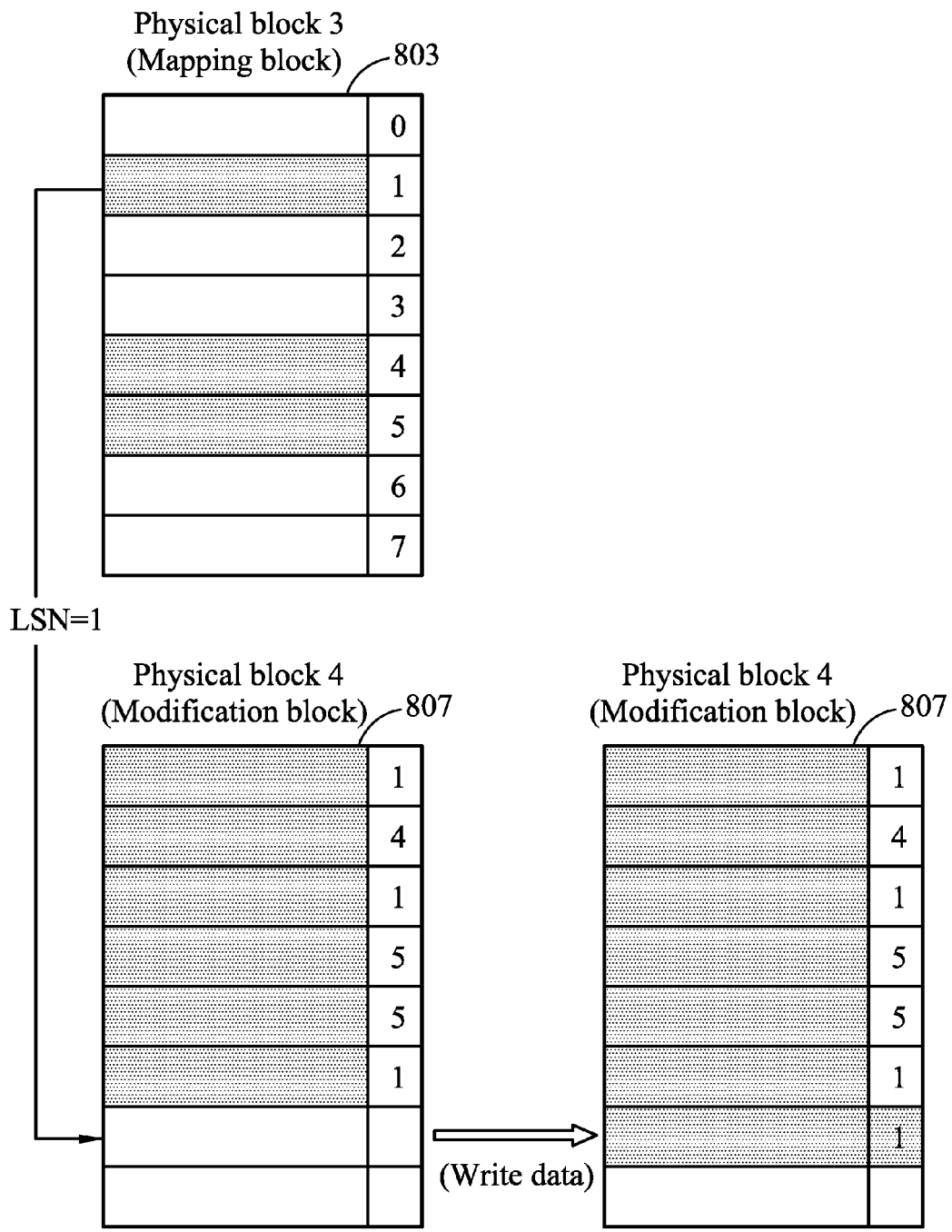

Refer to FIG. 8d, because the processor 102 obtains the location information of page 6 of the next free page in the corresponding modification block 807 (physical block 4), the processor 102 writes the predetermined data in the page (page 6) and writes the logical page number LSN (and the logical block number LBN, which is not shown in the figure) corresponding to the predetermined data in the redundant region of the page. In addition, referring back to FIG. 8c, since the processor 102 obtains the location of the next empty data field of the cache page 806, which is located in column 6 (as pointed by the arrow in FIG. 8c), the processor 102 next stores the logical page number LSN=1 corresponding to the predetermined data in column 6 of the cache page 806 loaded in the random access memory 103.

Figure 8E:
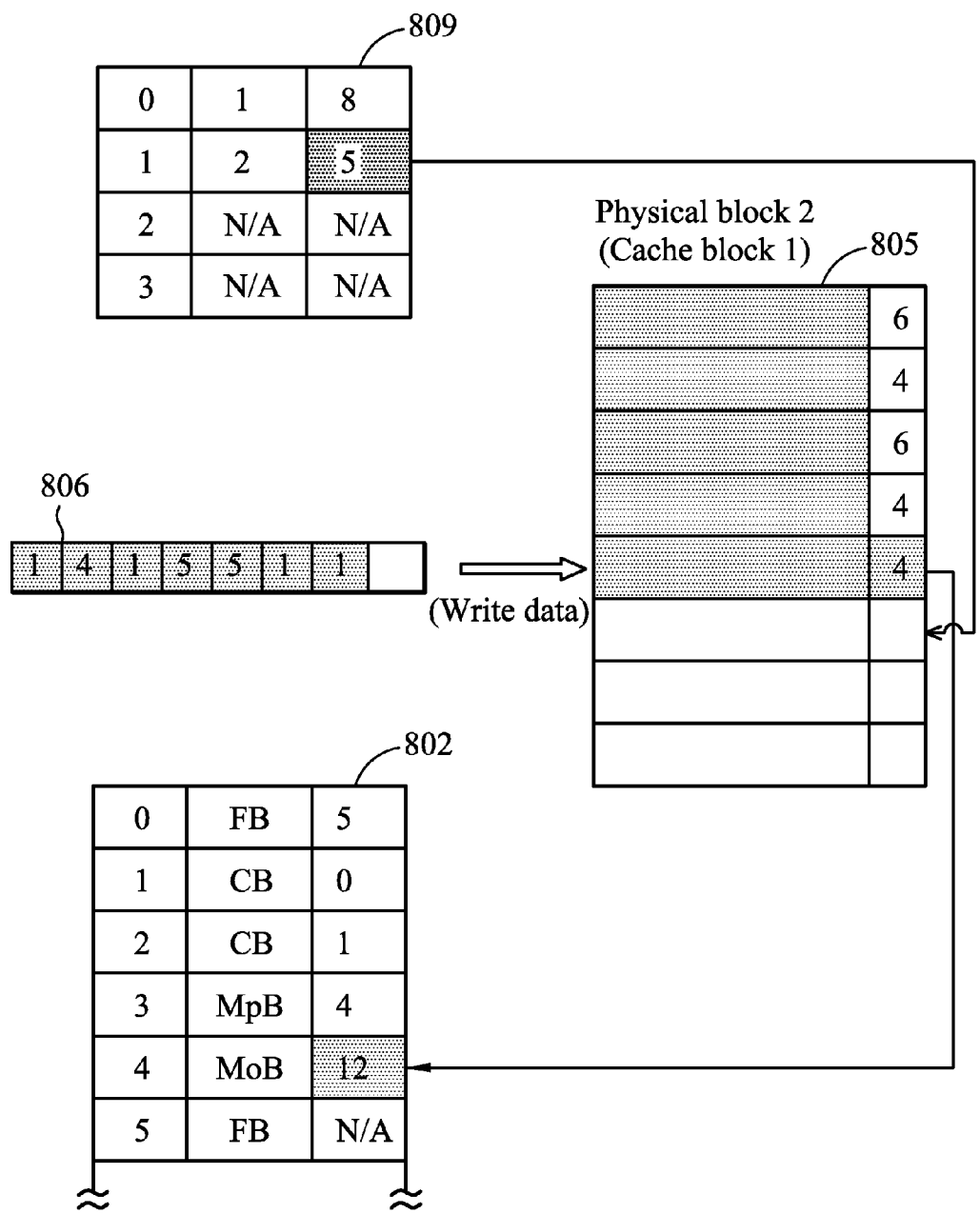

It is noted that since the cache block 805 is located in the flash memory device, the processor 102 next writes the content of the cache page 806 that has been updated in the random access memory device 103 back to a next empty page of the cache block 805. According to an embodiment of the invention, the processor 102 may obtain the location of the next empty page of the cache block 805, which is page 4, by looking the content up in the cache block index table 809. Therefore, the processor 102 may write content of the update cache page 806 in page 4 of the cache block 805 (physical block 2) as shown in FIG. 8e, and update the information of the first empty page of the cache block recorded in the cache block index table 809 to 5. In addition, after the write operation, the cache block index corresponding to the modification block becomes 12. Therefore, the processor 102 finally updates the cache block index corresponding to the modification block 807 stored in the physical block information table 802 to 12.

Figure 9:
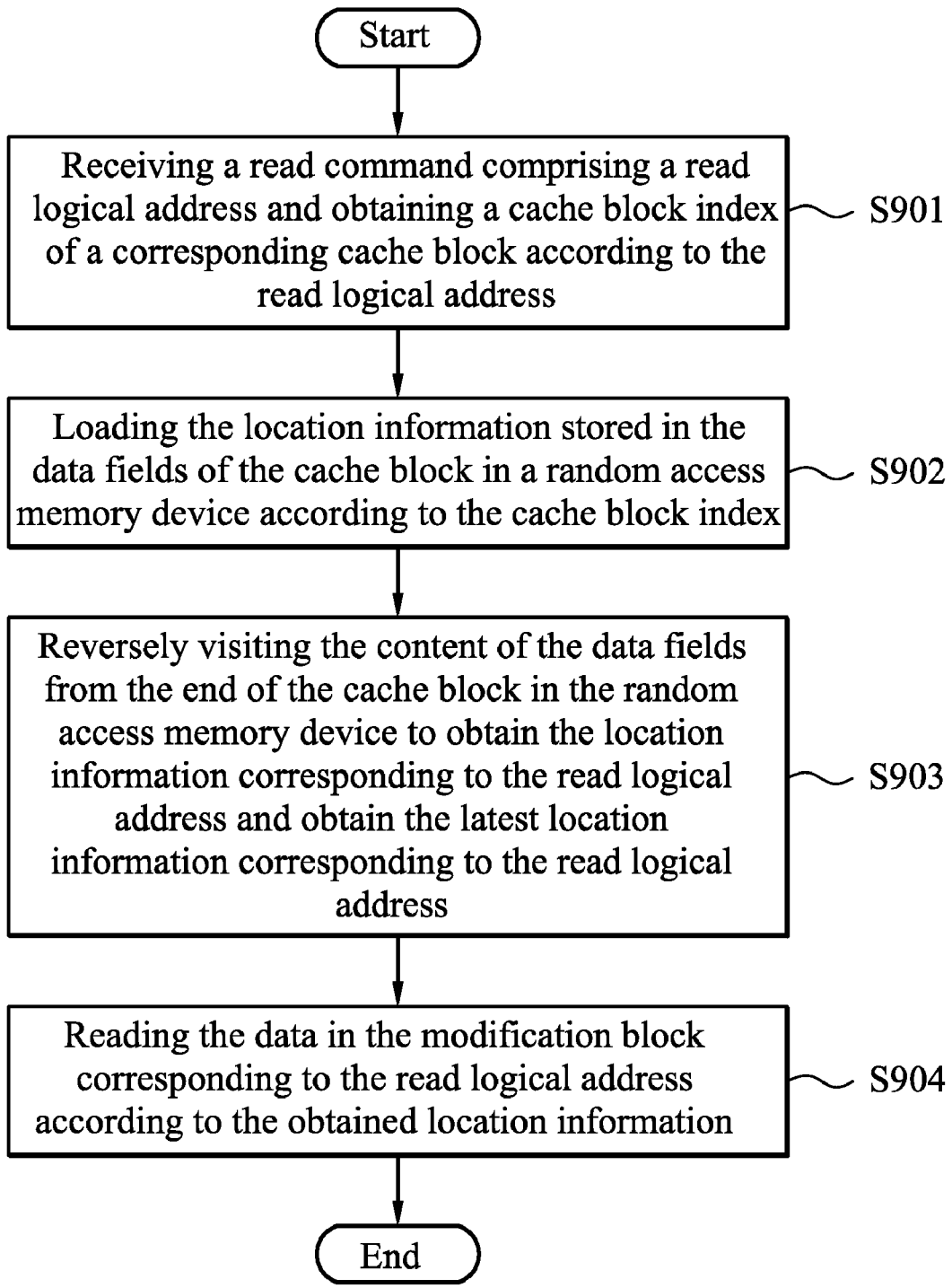
FIG. 9 shows a flow chart of a method for managing a flash memory device according to another embodiment of the invention.

FIG. 9 shows a flow chart of a method for managing a flash memory device according to another embodiment of the invention. In the beginning, the processor 102 receives a read command comprising a read logical address and obtains a cache block index of a corresponding cache block according to the read logical address (Step S901). Next, the processor 102 loads the location information stored in the data fields of the corresponding cache block in a random access memory device according to the cache block index (Step S902). Next, the processor 102 reversely visits (that is, reads) the content in the data fields from the end of the cache block loaded in the random access memory device to obtain the location information corresponding to the read logical address, and obtaining the latest location information corresponding to the read logical address (Step S903). Finally, the processor 302 reads the data in the modification block corresponding to the read logical address according to the obtained location information (Step S904).

Figure 10A:
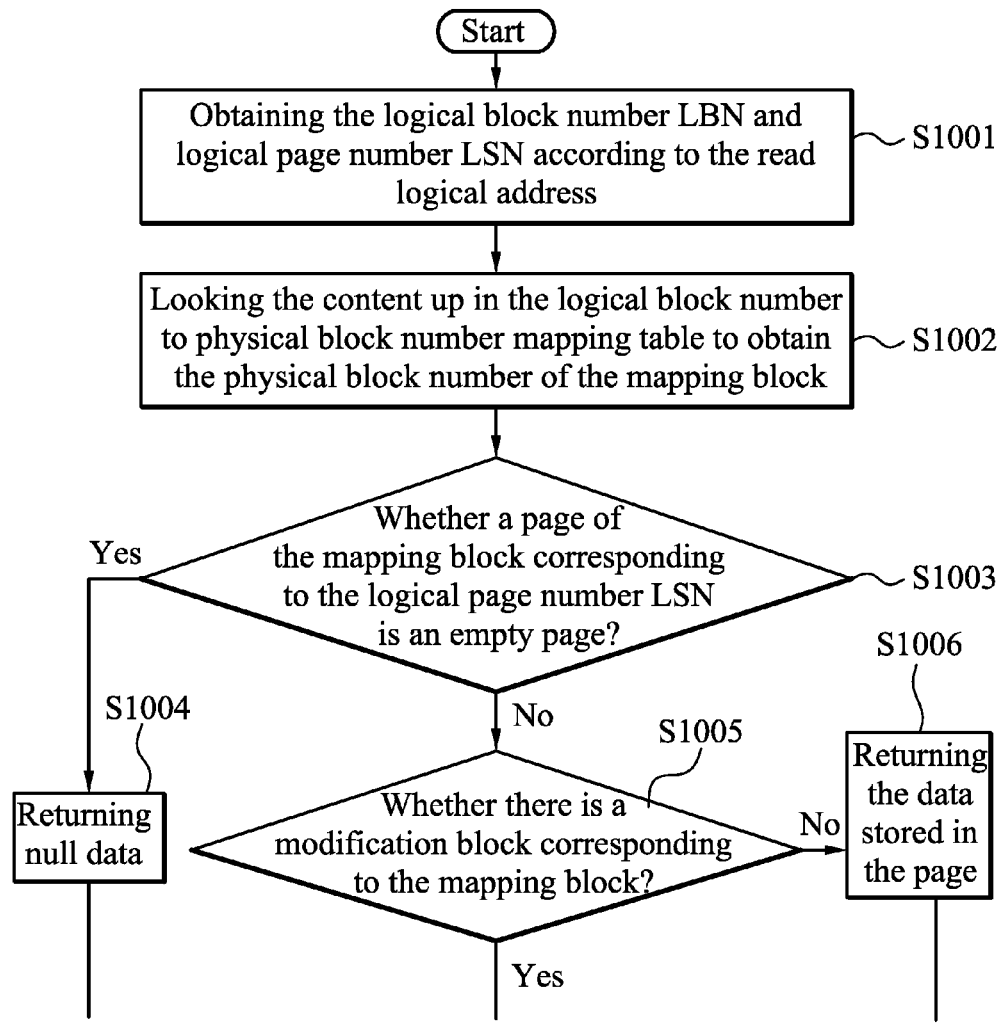
FIG. 10a and FIG. 10b show a detailed flow chart for reading the flash memory device according to an embodiment of the invention.
Figure 10B:
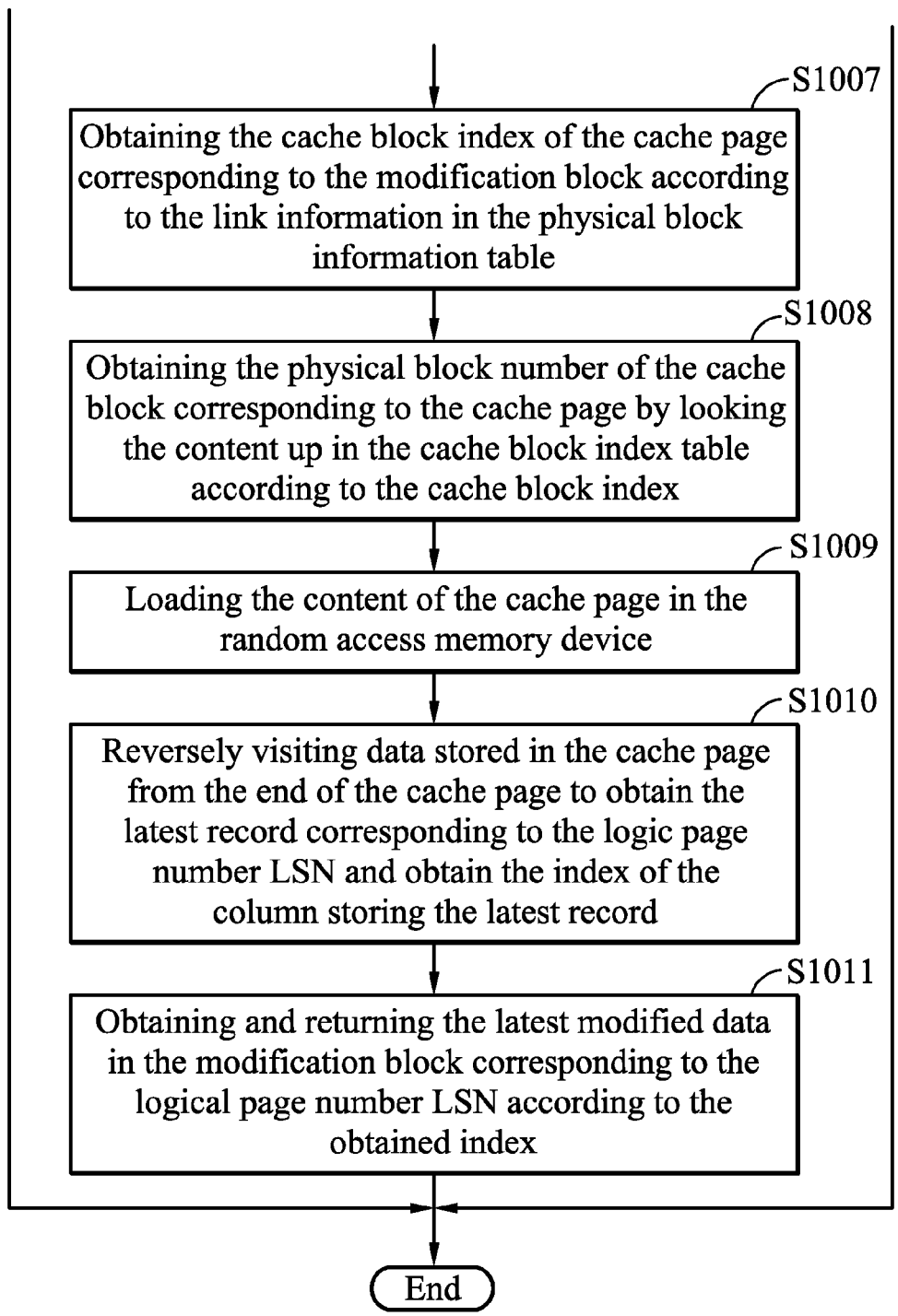

FIG. 10a and FIG. 10b show a detailed flow chart for reading the flash memory device according to an embodiment of the invention. In the beginning, the processor 102 obtains the logical block number LBN and logical page number LSN according to the read logical address in the read command (Step S1001). Next, the processor looks up the logical block number to physical block number mapping table (the first table) to obtain the physical block number of the mapping block (Step S1002). Next, the processor 102 determines whether a page of the mapping block corresponding to the logical page number LSN is an empty page (Step S1003). In response to the page corresponding to the logical page number LSN is an empty page, the processor 102 returns null data (Step S1004). Given that the page corresponding to the logical page number LSN is not an empty page, the processor 102 determines whether there is a modification block corresponding to the mapping block by looking the content up in the physical block information table (the second table) (Step S1005). When there is no modification block corresponding to the mapping block, the processor 102 directly return the data stored in the page (Step S1006). When there is a modification block corresponding to the mapping block, the processor 102 obtains the cache block index of the cache page corresponding to the modification block according to the link information in the physical block information table (Step S1007). Next, the processor 102 obtains the physical block number of the cache block corresponding to the cache page by looking the content up in the cache block index table (the third table) according to the cache block index (Step S1008). Next, the processor 102 loads the content of the cache page in the random access memory device 103 (Step S1009). Next, the processor 102 operates in the random access memory device 103, reversely visits (that is, reads) data stored in the cache page from the end of the cache page to obtain the latest record corresponding to the logic page number LSN, and obtains the index of the column storing the latest record (Step S1010). Finally, the processor 102 obtains and returns the latest modified data in the modification block corresponding to the logical page number LSN according to the obtained index (Step S1011).

Figure 11A:
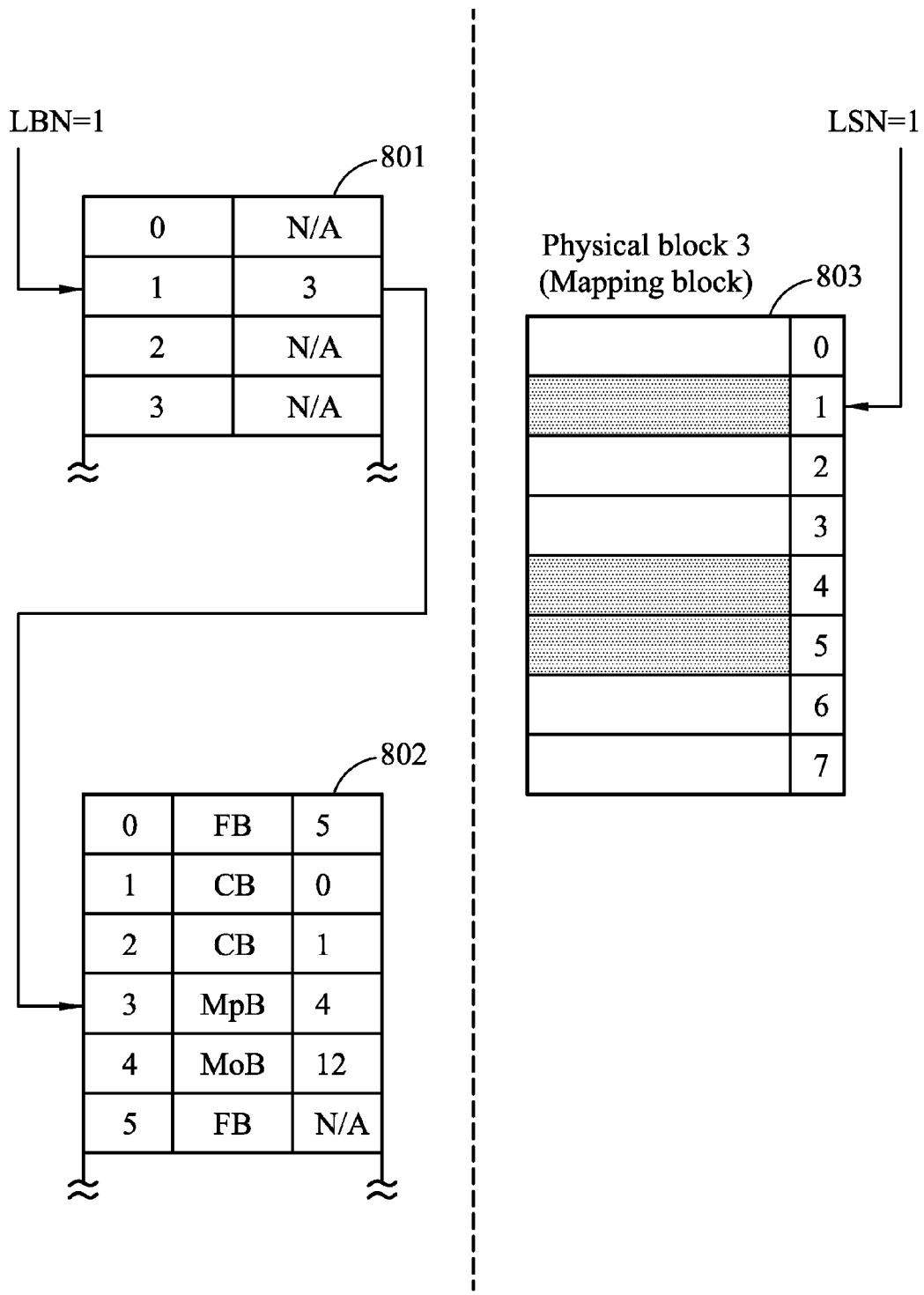
FIG. 11a-11d show the schematic diagrams for reading the flash memory device according to an embodiment of the invention.

FIG. 11a-11d show the schematic diagrams for reading the flash memory device according to an embodiment of the invention. Suppose that the received read logical address is 90, the processor obtains the logical block number LBN=1 and the logical page number LSN=1 as previously described. Next, as shown in FIG. 11a, the processor 102 looks up content in the data field in index 1 of the logical block number to physical block number mapping table 801 according to the logical block number LBN=1 to obtain the physical block number of the mapping block. According to an embodiment of the invention, when the content in the data field is empty, it means that there is no mapping block assigned to the logical block. Therefore, the processor may not be able to access valid data and then directly return. On the other hand, when the content in the data field is not empty, it means that there is a mapping block assigned to the logical block. In the embodiment, the physical block number of the corresponding mapping block is 3, it means that the mapping block is actually allocated in the physical block 3. The processor 102 accesses page 1 of the mapping block 803 (the physical block 3)

according to the logical page number (LSN=1) and determines whether the page has been used. According to an embodiment of the invention, the processor 102 may determine whether the page has been used according to the LBN and LSN stored in the redundant region. When there is no LBN and LSN stored in the redundant region, it means that the data region of the page has not been used. Therefore, the processor 102 returns empty data. On the other hand, when LBN and LSN have already been stored in the redundant region, it means that the data region of the page has been used. As shown in page 1 of the mapping block 803, the column filled with dots represents that the page has already been used. Therefore, the processor 102 looks up content in the data field in index 3 of the physical block information table 802 according to the obtained physical block number. According to the embodiment of the invention, when the link information of the mapping block is empty, it means that the data stored in the mapping block has not been modified. That is, the data stored in the mapping block is valid. The processor 102 may read and directly return the data in the mapping block. On the other hand, when the link information is not empty, it means that the original data in the mapping block has already been modified. That is, the data stored in the mapping block is invalid. Therefore, the processor 102 further obtains that the physical block number of the corresponding modification block is 4 via the physical block information table 802.

Figure 11B:
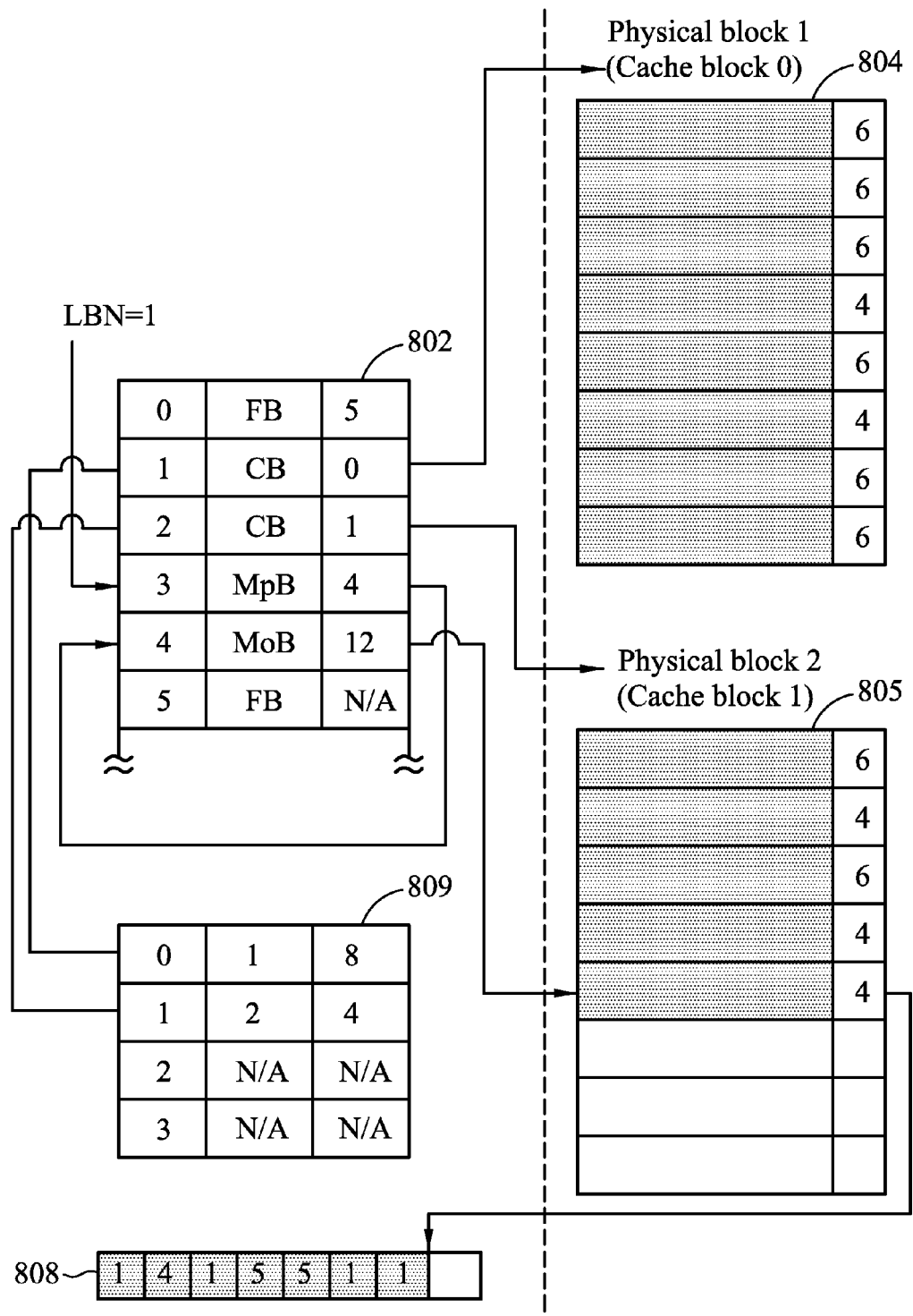

Next, the processor 102 looks up the physical block information table 802 according to the physical block number of the corresponding modification block to obtain the link information of the corresponding modification block. As previously described, the link information of the corresponding modification block is a cache block index of the corresponding cache page. As an example, in the embodiment, the cache block index is 12. Next, the processor 102 obtains the location of the cache page, which is allocated in page 4 (the remainder of dividing 12 by 8) of the corresponding cache block 1 (the quotient of dividing 12 by 8). Refer to FIG. 11b, the processor 102 obtains the physical block number of the cache block corresponding to the cache page via the cache block index table 809, obtaining that the physical block number of the corresponding cache block 1 (the cache block number is 1) allocated in the flash memory device is 2. Next, the processor 102 accesses page 4 of the corresponding cache block 805 (physical block 1) and loads the content of the corresponding cache page 808 in the random access memory device 103.

Next, the processor 102 reversely reads data stored in the cache page 808 from the end of the cache page 808 to obtain the index of the latest stored data corresponding to the logic page number LSN=1. As previously described, since the content of the cache page 808 has already been loaded in the random access memory device 103, there is no need for the processor 102 to read the modification block in the flash memory device 101. By just reading the cache page in the random access memory device 103, the location information corresponding to the latest data for logic page number 1 in the modification block may be obtained. Therefore, as compared to the conventional design, the reading speed of the flash memory device is greatly improved. In addition, although in the embodiments as previously illustrated, the processor 102 reversely reads the content from the end of the cache page stored in the random access memory device 103, it is also possible for the processor 102 reading content of the cache page from the beginning of the cache page to obtain the location information of the page to be accessed in the corresponding modification block. Thus, the invention is not limited thereto.

Figure 11C:
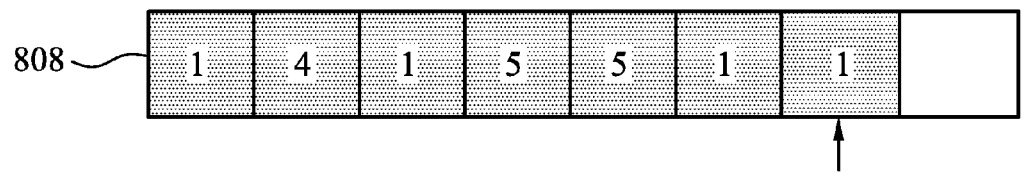
Figure 11D:
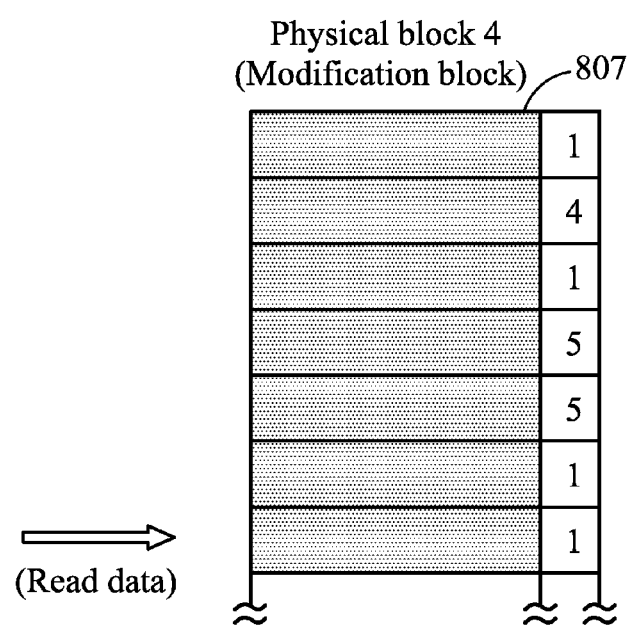

As shown in FIG. 11c, the processor 102 obtains the location of the latest data for the logical page number 1 in the cache page 808, which is located in column 6. Therefore, it is realized that the latest data corresponding to the logical address 90 is stored in page 6 of the corresponding modification block. Finally, as shown in FIG. 11d, the processor 102 accesses the data region in page 6 of the corresponding modification block 807 (physical block 4) and returns the data.

According to an embodiment of the invention, the amount of cache blocks may be determined according to the requirement of the computing system. As an example, for a flash memory device, four cache blocks may be allocated and numbered from 0 to 3 in order. When initializing the cache block, the processor 102 establishes the cache block by reading the redundant region of the corresponding modification blocks to obtain the location information. The processor 102 next establishes the logical block number to physical block number mapping table 300 as shown in FIG. 3, the physical block information table 400 as shown in FIG. 4 and the cache block index table 500 as shown in FIG. 5 according to the data stored in the redundant regions of the mapping blocks, the corresponding modification blocks and the corresponding cache blocks. According to an embodiment of the invention, in order to prevent undesired errors for data stored in the cache block, which may occur when the computing system is suddenly shut down, the processor 102 may check whether the content in the cache block is correct every time when initializing the computing system. As an example, the processor 102 may check the location information (i.e. the logical page number) stored in the data field of each cache page and the physical block number of the corresponding modification block stored in the redundant region of the corresponding cache page, and determine whether the location information stored in the cache page matches the logical page number stored in the redundant region of the pages of the corresponding modification block. When the location information in the cache page matches the logical page numbers stored in the corresponding modification block, the cache block may be reserved. When the location information in the cache page does not match the logical page numbers stored in the corresponding modification block, the processor 102 may abandon the cache block by erasing the data directly. In addition, when the cache block is full, the processor 102 may allocate a new cache block (as shown in FIG. 5a and FIG. 5b). When amount of used cache blocks reaches the number of maximum usable cache blocks, as an example, when the data field for recording the number of the first free page of the cache block 3 as shown in FIG. 5b becomes 8 (the maximum page number of the memory block), the processor 102 may erase all cache blocks to release the memory space.

As those of ordinary skill in the art should readily appreciate, although the read operation and write operation are illustrated separately, the characteristics of reading and writing the flash memory device in the invention are interrelated. Given the data stored in the mapping block corresponding to the logical address is not suitable for being accessed directly, in other words, there is already some data stored in the corresponding page of the mapping block to be written in a write operation; or the original data stored in the corresponding page of the mapping block has already been modified in a read operation, the processor may obtain the location information of a first free page of the modification block corresponding to the mapping block or the location information of the latest data corresponding to the logical address according to the information of the mapping block. Therefore, the predetermined data may be written in or read out more precisely and efficiently.

In addition, when performing a merge operation of the flash memory device, the processor 102 may first determine whether the data stored in the data region of the modification block shall be written in the page number order of a corresponding mapping block according to the logical block number LBN and the logical page number LSN stored in the redundant region of the modification block. If the data stored in each page of the modification block was written in the page number order of a corresponding mapping block, the processor 102 may directly erase the mapping block, and transfer the corresponding modification block into a mapping block. On the other hand, if the modified data of the mapping block was not written in the page number order in the pages of the corresponding modification block, the processor 102 may obtain a free block, merge valid data in the corresponding modification block and the mapping block and store the valid data in the free block. After the merge operation, the modification block and the mapping block may be erased and the memory block storing the merged data becomes the new mapping block.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for managing a flash memory device comprising at least one mapping block, at least one modification block and at least one cache block, the method comprising:
   receiving a write command comprising a write logical address and predetermined data for writing the predetermined data in the flash memory device;
   determining whether a page of the mapping block corresponding to the write logical address has been used; and
   writing the predetermined data in an empty page of the modification block corresponding to the mapping block in response to that the page of the mapping block corresponding to the write logical address has been used, wherein the writing step further comprises:
      loading content of a cache page of the cache block corresponding to the modification block according to the write logical address to a random access memory device;
      reading orderly a plurality of data fields of the cache page in the random access memory device to obtain location information of the empty page of the modification block, wherein cache page of the cache block comprises the plurality of data fields to store the location information corresponding to the data which has been written in the pages of the modification block in order; and
      writing the predetermined data in the empty page of the modification block according to the obtained location information.

2. The method as claimed in claim 1, further comprising:
   writing location information of the page of the modification block storing the predetermined data in an empty page of the cache block.

3. The method as claimed in claim 1, further comprising:
   obtaining a logical block number and a logical page number according to the write logical address; and
   writing the logical page number in the cache block as location information of the page of the modification block storing the predetermined data.

4. The method as claimed in claim 3, further comprising:
   allocating a data region and a redundant region in each cache page of the cache block, wherein the data region comprises the plurality of data fields to store the logical page number, and the redundant region stores a cache block index of the cache block and a physical block number of the modification block corresponding to the cache page of the cache block.

5. The method as claimed in claim 3, further comprising:
   establishing a first table in the random access memory device for recording a mapping relationship between each logical block and each mapping block; and
   establishing a second table in the random access memory device for recording status and link information of each physical block of the flash memory device.

6. The method as claimed in claim 5, further comprising:
   storing a physical block number of the mapping block in the first table; and
   storing a physical block number of the modification block corresponding to the mapping block and a cache block index of the cache block in the second table.

7. The method as claimed in claim 5, wherein the step of determining whether the page of the mapping block corresponding to the write logical address has been used further comprises:
   looking the content up in the first table according to the logical block number to obtain the corresponding mapping relationship, and reading the page corresponding to the logical page number of the mapping block corresponding to the logical block number; and
   reading information stored in a redundant region of the page to determine whether the page of the mapping block corresponding to the write logical address has been used.

8. The method as claimed in claim 5, wherein the step of loading the content of the cache page of the cache block corresponding to the modification block according to the write logical address to the random access memory device further comprises:
   looking the content up in the second table according to a physical block number of the mapping block to obtain a physical block number of the modification block corresponding to the mapping block when the page of the mapping block has been used;
   looking the content up in the second table according to the physical block number of the modification block to obtain a cache block index of the cache block corresponding to the modification block; and
   looking the content up in a third table according to the cache block index to obtain information for loading content of the cache page of the cache block comprising information corresponding to non-empty pages of the modification block to the random access memory device,
   wherein the third table stores the cache block index and a physical block number corresponding to the cache block and a page number of a first free cache page of the cache block.

9. The method as claimed in claim 1, wherein the location information of the empty page in the modification block corresponding to the write logical address is obtained by reading the data fields in a reversed order from the end of the cache page loaded in the random access memory device.

10. A method for managing a flash memory device comprising at least one mapping block, at least one modification block and at least one cache block, comprising:

receiving a read command comprising a read logical address for reading data from a page of the flash memory device;

determining whether data stored in a page of the mapping block corresponding to the read logical address has been modified; and reading the predetermined data from the modification block corresponding to the mapping block in response to that the data stored in the page of the mapping block corresponding to the read logical address has been modified, wherein the reading step further comprises:

loading content of a cache page of the cache block corresponding to the modification block according to the read logical address to a random access memory device;

reading orderly a plurality of data fields of the cache page stored in the random access memory device to obtain location information of the page corresponding to the read logical address in the modification block, wherein cache page of the cache block comprises the plurality of data fields to store the location information corresponding to data which has been written in the pages of the modification block in order; and reading the predetermined data from the page of the modification block according to the location information.

11. The method as claimed in claim 10, further comprising:

establishing a first table in the random access memory device for recording a mapping relationship between each logical block and each mapping block; and establishing a second table in the random access memory device for recording a status and link information of each physical block.

12. The method as claimed in claim 11, further comprising:

storing a physical block number of each mapping block in the first table; and storing a physical block number of each modification block and a cache block index of a cache block corresponding to each modification block in the second table.

13. The method as claimed in claim 11, wherein the step of determining whether the data stored in a page of the mapping block corresponding to the read logical address has been modified further comprises:

obtaining a logical block number and a logical page number according to the read logical address;

looking the content up in the first table according to the logical block number to obtain the physical block number of the mapping block corresponding to the logical block number; and looking the content up in the second table according to the physical block number to determine whether the data stored in the page has been modified.

14. The method as claimed in claim 11, wherein the step of reading the predetermined data from the modification block-corresponding to the mapping block further comprises:

looking the content up in the second table according to the physical block number of the mapping block to obtain a physical block number of the modification block corresponding to the mapping block when the data stored in the page of the mapping block has been modified;

looking the content up in the second table according to the physical block number of the modification block to obtain a cache block index of the corresponding cache block; and looking the content up in a third table according to the cache block index to obtain information for loading the content of the cache page of the cache block to the random access memory device, wherein the third table stores the cache block index and a physical block number corresponding to the cache block and a page number of a first free cache page of the cache block.

15. The method as claimed in claim 14, further comprising:

allocating a data region and a redundant region in each cache page of the cache block, wherein the data region comprises a plurality of data fields to store the logical page number, and the redundant region stores the cache block index of the cache block and the physical block number of the modification block corresponding to the cache block.

16. The method as claimed in claim 14, further comprising:

reading the data fields in a reversed order from the end of the cache page loaded in the random access memory device to obtain the location information in the modification block of the page corresponding to the read logical address.

17. A computing system, comprising:

a flash memory device comprising at least one mapping block, at least one modification block and at least one cache block;

a random access memory device; and a processor coupled to the flash memory device and the random access memory device, wherein the processor is configured to perform:

receiving a write command comprising a write logical address and predetermined data;

loading content of a cache page from the cache block corresponding to the modification block according to the write logical address to the random access memory device in response to that a page of the mapping block corresponding to the write logical address has been used;

reading orderly the content of the cache page stored in the random access memory device to obtain location information of an empty page of the modification block, and writing the predetermined data to the empty page according to the location information, wherein each cache page of the cache block comprises a plurality of data fields to store location information corresponding to the data has been written in the pages of the modification block in order.

18. A computing system, comprising:

a flash memory device comprising at least one mapping block, at least one modification block and at least one cache block;

a random access memory device; and a processor coupled to the flash memory device and the random access memory device, wherein the processor is configured to perform:

receiving a read command including a read logical address;

loading content of a cache page from the cache block corresponding to the modification block according to the read logical address to the random access memory device in response to that a page of the mapping block corresponding to the read logical address has been modified;

reading orderly the content of the cache page stored in the random access memory device to obtain location information of a page corresponding to the read logical address in the modification block; and reading predetermined data from the page of the modification block corresponding to the read logical address according to the location information, wherein each cache page of the cache block comprises a plurality of data fields to orderly store the location information corresponding to data which has been written in the page of the modification block.

19. A method for managing a flash memory device comprising at least one mapping block, at least one modification block and at least one cache block, comprising:

receiving an access command comprising a logical address to access predetermined data in the flash memory device; and accessing the modification block corresponding to the mapping block in response to that the mapping block corresponding to the logical address is determined not to be accessed for the predetermined data, wherein the step of accessing the modification block further comprises:

loading content of a cache page corresponding to the modification block from the cache block in the flash memory device to a random access memory device;

reading orderly the content of the cache page in the random access memory device to obtain location information for accessing the predetermined data in the modification block, wherein cache page of the cache block comprises a plurality of data fields to store the location information corresponding to the data which has been written in the pages of the modification block in order; and accessing the predetermined data in the modification block of the flash memory device according to the location information.

* * * * *